United States Patent Office 3,644,534
Patented Feb. 22, 1972

3,644,534
METHOD FOR THE PREPARATION OF HYDROXYALKYL ETHERS
Kenneth G. Reabe, Delmont, and Hans Dressler, Monroeville, Pa., assignors to Koppers Company, Inc.
No Drawing. Filed Nov. 25, 1968, Ser. No. 778,833
Int. Cl. C07c 43/22
U.S. Cl. 260—613 D                    7 Claims

ABSTRACT OF THE DISCLOSURE

A process is provided for the production of phenylhydroxyalkyl ethers such as phenylhydroxypropyl ether, resorcinol bis($\beta$-hydroxyethyl)ether, catechol bis($\beta$-hydroxyethyl)ether, hydroquinone bis($\beta$-hydroxybutyl)ether, pyrogallol tris($\beta$-hydroxyethyl)ether, and phloroglucinol tris($\beta$-hydroxyethyl)ether by reacting at ambient to 110° C., a monohydric, dihydric, or polyhydric phenol such as phenol, resorcinol, or pyrogallol and an equivalent of alkylene oxide, such as ethylene oxide, propylene oxide, or butylene oxide per equivalent of phenolic hydroxyl in the presence of an aqueous medium having a pH of 8–13. The product is recovered in high yields by cooling and separating from the mother liquor. The mother liquor is then recycled to serve as the aqueous medium for a subsequent reaction.

The prepared compounds have aromaticity, an ether linkage, and a reactive hydroxyl group which make them useful as specialized components in polyester and polyurethane resin formulations.

BACKGROUND OF THE INVENTION

It is known from the prior art that alkylene oxides can be reacted with mixtures of a molten phenolic compound and a basic catalyst at elevated pressure and at a temperature above about 150° C. Large excesses of alkylene oxide are required to obtain high conversion of the phenolic compound. Reaction times are quite long and the reaction is not selective, giving a complex mixture of unreacted phenolic compound, phenylhydroxyalkyl ethers, and phenyl-polyoxyalkylene ethers in which the length of the polyoxyalkylene chain varies considerably. In addition, if the reactants contain water, significant amounts of alkylene and polyoxyalkylene glycols are unavoidably produced. Although this glycol formation can be reduced by carrying out the reaction under relatively moisture-free conditions, the products so-produced are still complex mixtures having undesirably large molecular weights which restrict their use. Attempts to control the reaction to introduce only one equivalent of alkylene oxide per equivalent of phenolic hydroxyl have failed due to the tendency to form polyoxyalkylated products.

The production of 2-hydroxyalkyl ethers, with the substantial exclusion of polyoxyalkylated products, by the condensation of phenol with a single molar equivalent of 1,2-alkylene oxide is taught by U.S. Pat. No. 3,364,267. However, conditions for this reaction are critical, requiring specific catalysts, a three-fold excess of 1,2-alkylene oxide over phenol, high pressure, and temperature. Further, the patent shows in its examples a procedure for laboratory scale experiments with no attempt made to quantitatively isolate the product.

The process of the invention is an improvement over the known art insofar as one equivalent of alkylene oxide can be introduced per equivalent of phenolic hydroxyl without reverting to specific catalysts, an excess of alkaline oxide over phenol, or high temperature or pressure. Quite surprisingly, the reaction can be conducted in aqueous medium to give high yields of product with little or no glycol or polyoxyalkylene glycols formed.

Further, the use of an aqueous medium permits easy recovery of product by cooling and separating the desired phenylhydroxyalkyl ether from the mother liquor. This product can be purified by distillation or recrystallization. The overall yield of the reaction is improved if the mother liquor is recycled to the reaction site to serve as the aqueous medium for a subsequent reaction.

As has been stated, the desired compounds, because of the polyfunctional hydroxyl moiety, have utility in polyester and polyurethane chemistry. In a copending application, Ser. No. 700,311, filed Dec. 23, 1967, resorcinol bis($\beta$-hydroxyethyl)ether is mentioned as a portion of the dialcohol component in a free-flowing uncured polyester resin powder. Generally, uncured polyester resins are liquid.

SUMMARY OF THE INVENTION

A process is provided for the production of phenylhydroxyalkyl ethers by reacting mono-, di-, or polyhydric phenols with one equivalent of 1,2-alkylene oxide per equivalent of hydroxyl in an aqueous medium, preferably at a pH of 8–13, at a temperature of ambient to 110° C., and at a pressure of 0–50 p.s.i.g. The use of aqueous solvent, the near stoichiometric ratio of 1,2-alkylene oxide to phenolic hydroxyl, and recycling of mother liquor are the keys to the reaction. The use of aqueous medium permits easy recovery, isolation and separation of the desired phenylhydroxyalkyl ether by cooling the reaction mixture, to separate essentially pure product from the mother liquor. The quantity of 1,2-alkylene oxide is critical; and if the equivalent ratio of 1,2-alkylene oxide to phenolic hydroxyl is not much greater than 1, glycol and polyoxyalkylated products are essentially eliminated. Recycling of the mother liquor to the reaction site to serve as the aqueous medium increases the overall yield of the reaction.

DETAILED DESCRIPTION

The effective phenolic compounds in the reaction are mono-, di-, and trihydric phenols, such as phenol, catechol, resorcinol, hydroquinone, pyrogallol, and phloroglucinol. The alkylene oxides which are effective are the lower alkyl, 1,2-alkylene oxides such as ethylene oxide, propylene oxide, and butylene oxide.

It is believed that the catalytic species is the phenate ion. This may be pre-formed or formed in situ by the reaction of alkaline materials with the phenol.

Alkaline materials effective for catalyst generation include alkali metals, alkali hydroxides, and carbonates, and alkaline earth hydroxides. The pH range of 8–13 is satisfactory. Below 8, the reaction is insufficiently catalyzed; and, above 13, glycol and polyoxyalkylated product formation is substantially increased.

As was stated, an aqueous system is the most effective reaction medium. The initial phenolic concentration appears to have little effect on the reaction. Concentrations of 18.7, 29.8, 34.9, and 41 weight percent of phenolic compound in water were investigated.

The 1,2-alkylene oxide generally is added as a liquid; however, it can be added as a gas. The equivalent ratio of 1,2-alkylene oxide present to phenolic hydroxyl is found to have the largest effect on the yield and purity of the product isolated. If an excess of 1,2-alkylene oxide, greater than 10% equivalent based on hydroxyl, is reacted, substantial amounts of glycol and polyoxyalkylated products are formed. 1,2-alkylene oxide is generally added to an alkaline solution of the phenolic compound. It is also found that the phenolic compound could be added concomitantly with the 1,2-alkylene oxide provided that the equivalent ratio of alkylene oxide to hydroxyl never exceeded 1.1. The rate of addition of alkylene oxide charged affects the rate of reaction and the exothermicity of the reaction but has no large effect on the yield or purity of the product when cautions are taken to insure that a large excess of alkylene oxide is not present.

The amount of catalyst charged affects the rate of reaction, and the exothermicity of the reaction, with higher concentrations giving an increased rate and higher exotherm but has no large effect on yield or purity provided the pH is maintained between 8 and 13 and the amount of alkylene oxide reacted is near stoichiometric. Concentrations of 0.10, 0.15, and 0.20 mole per mole of phenolic compound were investigated.

Temperature of the reaction is found to be effective between ambient and 110° C. Below 50° C., 1,2-alkylene oxide, although appreciably soluble in the aqueous medium, does not react with the phenolic compound at a very appreciable rate. At above 110° C., (inert positive pressure needed) glycol and polyoxyalkylated product formation completes favorably with the desired ether and separation from the side products is extremely difficult. The preferred range of temperature is between 60 and 80° C.

Higher than atmospheric pressure can be used; and, in fact, it may be advantageous to do so. A positive pressure of inert gas will keep the 1,2-alkylene oxide from escaping solution to the vapor space above the reaction. The range of pressure can be from 0–1500 p.s.i., but, for practicality, the preferred range of pressure is from 0–50 p.s.i.g. A suitable inert gas is nitrogen.

The procedure for the reaction consists of charging water and phenolic compound to the reactor with agitation. Catalyst is stirred in until the phenolic compound dissolves. The pH is adjusted to 8–13. After solubilization and the desired pH are attained, 1,2-alkylene oxide is added, preferably at 50–110° C. If the alkylene oxide is added as a gas, it can be sparged into the reactor. It can be added as a liquid under an inert pressure of nitrogen up to 50 p.s.i.g. Addition is continued until one equivalent of 1,2-alkylene oxide per equivalent of hydroxyl has been added. The amount of 1,2-alkylene oxide can be determined by weight gain of the reaction mixture or by the weight loss of the alkylene oxide cylinder, by rotameter or other suitable devices. The reaction is, for the most part, rapid and a period of up to 1 hour at elevated temperature is about all that is needed for the reaction after the last of the alkylene oxide has been added. The reaction is exothermic and may require external cooling such as a water-jacketed reactor.

At the completion of the reaction, the reaction medium is cooled and the desired phenylhydroxyalkyl ether is separated from the mother liquor, by crystallization or extraction. Recrystallization or distillation can be used to purify the product.

Yields are further increased by recycling the mother liquor to the reactor to be used as a solvent for the next reaction.

Recycling the mother liquor increases the yield for two reasons:

(1) Intermediate reaction products soluble in the mother liquor are converted on reaction with fresh alkylene oxide to the desired products.

(2) The mother liquor containing reactive intermediate species and serving as solvent helps insure that alkylene oxide will not be in excess, thus preventing harmful side reactions.

For a better understanding of the nature of this invention, reference should be had to the accompanying examples. These examples serve to illustrate the invention rather than to define its scope.

EXAMPLE

The reactor used was a 500-ml., 4-neck, round-bottom flask equipped with a thermometer, an electrically driven stirrer, a fritted-glass sparger for ethylene oxide addition, and an air condenser. Ethylene oxide was metered through a rotameter and sparged into the reactor and the small amount of unreacted off-gas was vented through a wet test meter. Gain in weight of the reaction mixture was the ultimate measure of ethylene oxide absorption.

The reactor was charged with 110 g. (1.0 mole) of resorcinol and about 100 g. of water, and the mixture was stirred to solution. A solution of 6 g. (0.15 mole) of sodium hydroxide in about 50 g. of water was prepared and added to the reactor. A remainder of 253.1 g. of water was added to bring the total charge weight to 369.1 g. (concentration of resorcinol was 29.8 weight percent). The resulting solution (pH of 8.5) was stirred and heated to 75° C., and gaseous ethylene oxide was fed in at a rate of 0.719 liters per minute (about 1.5 g. per min.). After 64 min. at 75–80° C. (slight intermediate cooling required), the ethylene oxide feed was stopped. A gain in weight of 87.3 g. (1.98 moles of ethylene oxide; 99% of theory) was obtained. The reaction mixture (pH of 9.5) was allowed to cool until crystallization began. After cooling, in an ice bath to 10° C., the slurry of product was filtered on a 600-ml. fritted-glass Buchner funnel. The wet cake of product was washed on a filter with two 50-ml. portions of ice water, adding the washes to the mother liquor. The product was dried in vacuum at 60° C., to obtain 149.4 g. (75.4% of theory based on resorcinol) of off-white resorcinol bis($\beta$-hydroxyethyl) ether, melting point 89–91° C.

EXAMPLE II

The purpose of the example is to show the deleterious effect of too large an excess of 1,2-alkylene oxide on the process.

The procedure of Example I was repeated with the exception that the gain in weight due to ethylene oxide absorption was 106 g. (2.41 moles, 120% of theory on resorcinol). Prolonged cooling and repated seeding of the reaction mass was necessary to crystallize a product which, after the normal workup, had a melting range of 60–82° C., and was obtained in 67% crude yield. The mother liquor was a complex mixture and contained ethylene glycol, polyoxyethylene glycols, and polyoxyalkylated by-products.

No product could be crystallized from a similar preparation in which 132.1 g. (150% of theory) of ethylene oxide was reacted.

EXAMPLE III

To show the procedure and effect of recycling of the mother liquor, the following experiment was conducted. The combined mother liquor and washes from the process of Example I were concentrated on a rotary evaporator to 235.2 g. and were charged to the reactor. Fresh resorcinol (110 g.–1.0 mole) and 72.7 g. of water were added to bring the total charge weight to 417.9 g. The resulting solution (pH 8–8.5) was stirred and heated to 75° C. and ethylene oxide was added, as in Example I, until 90.7 g. (2.06 moles, 103% of theory on fresh resorcinol) had been absorbed. The reaction was cooled and worked up in the same manner as Example I to obtain 166.2 g. (84% of theory on fresh resorcinol, 79.7% of theory average based on total resorcinol charged in series) of resorcinol bis($\beta$-hydroxyethyl) ether, melting point 86–89° C.

EXAMPLE IV

The combined mother liquor and wash liquors from the process of Example III were concentrated to 258.2 g. A 206.6 g. portion (80%) of this concentrate, 88.0 g. (0.8 mole) of fresh resorcinol and sufficient water to bring the total weight to 334.3 g. was added to the reactor. Additional sodium hydroxide (1.0 g.) was added to adjust the pH to 8.5. Ethylene oxide was added at about 1.5 g. per min. to the reaction mixture at 74–77° C. during 61 minutes. The gain in weighet due to ethylene oxide absorption was 72.9 g. (1.65 moles, 103% of theory on fresh resorcinol). The product was worked up in a fashion similar to Examples I and III to obtain 152 g. (96% of theory on fresh resorcinol, 88.4% average on total resorcinol charged in series) of resorcinol bis(β-hydroxyethyl) ether, melting point 86–89° C.

EXAMPLE V

To a reactor equipped as in Example I, except for two graduated addition funnels in lieu of a sparger tube, was charged 200 g. of 2% aqueous sodium hydroxide solution, 6.6 g. of resorcinol, and 125 ml. of water. To the stirred solution below 40° C. was added dropwise 82.7 g. (1.42 moles) of propylene oxide from one addition funnel while adding simultaneously form the second funnel 200 g. of 30 weight percent aqueous solution of resorcinol at rates which maintained the pH of the reaction below 10.7. After completion of the additions (ca. 3.5 hours), the reaction mass was slowly heated to 60–70° C. for the remainder of 6 hours. The reaction mass was cooled to room temperature and neutralized to pH 7 with dilute aqueous sulfuric acid. The lower organic phase was separated and subsequently distilled to obtain 170.4 g. (65% of theory) of resorcinol bis(β-hydroxypropyl) ether, B.P. 194–201° C./5 mm. Hg.

EXAMPLE VI

To a reactor equipped as in Example V was charged 325 g. of water, 8 g. of flake sodium hydroxide, and 8 g. of resorcinol and the resulting solution was heated to 40° C. To this solution at 40–65° C. was added dropwise and concomitantly from separate dropping funnels 200 ml. of 30 weight percent aqueous resorcinol solution and 103.5 g. (1.44 moles) of 1,2-butylene oxide during 4 hours at rates controlling the pH between 10.3 and 11.8. Following completion of the addition, the reaction mass was heated to 65–75° C. for 1.5 hours. The mixture was cooled to room temperature, neutralized as in Example V, and the lower organic phase separated. Distillation of this organic product gave 203.4 g. (80% of theory) of resorcinol bis(β-hydroxybutyl) ether, B.P. 204–220° C./5 mm. Hg.

EXAMPLE VII

The reaciton conditions of Example I were repeated except that hydroquinone was substituted for resorcinol. Recovery of product as described in Example I gave 77% yield of hydroquinone bis(β-hydroxyethyl) ether M.P. 104–6° C.

EXAMPLE VIII

The reaction conditions of Example I were repeated except that catechol was substituted for resorcinol and 0.866 mole of ethylene oxide per equivalent of phenolic hydroxyl was reacted. Upon cooling, to room temperature, no precipitation occurred. The mixture was neutralized to pH 7 with dilute aqueous sulfuric acid. The lower organic phase was separated and distilled through a fractionating column to give a 15% yield of catechol mono-(beta-hydroxyethyl) ether, M.P. 93–8° C., B.P. 162–5° C./7–9 mm. Hg, and a 30% yield of catechol bis(beta-hydroxyethyl) ether, M.P. 74–81° C., B.P. 188–93° C./6 mm. Hg.

EXAMPLE IX

The following experiment shows the effects of conducting the preparation under pressure. To a clean, stainless steel, autoclave of one-liter nominal capacity was charged 506 g. of water and 12 g. of sodium hydroxide flakes, and the mixture was stirred to solution. With agitation, 220 g. of resorcinol was added and stirred until the resorcinol was solubilized. The pH of the resulting solution was 8.5. The reactor was evacuated and was purged several times by pressuring to 15.0 p.s.i.g. with nitrogen and venting. The reactor was sealed to the atmosphere and the contents were stirred and heated to 75° C. and nitrogen admitted to a pressure of 15.0 p.s.i.g. Liquid ethylene oxide was fed slowly under the surface of the reaction mixture from a storage cylinder pressured to 50 p.s.i.g. with nitrogen. The reaction was exothermic and water cooling, through an internal cooling coil in the autoclave, was required to maintain a reaction temperature of 70–80° C. The reactor pressure was maintained at 15–25 p.s.i.g. by control of the ethylene oxide feed rate. The ethylene oxide feed was terminated after a total of 169.2 g. (equivalent ratio of ethylene oxide to phenolic hydroxyl of 0.96) had been added during 2.0 hours. The reaction mixture was cooled with stirring to 30° C., the autoclave vented, purged several times with nitrogen, and left open to the atmosphere. The mixture was finally cooled to 20° C., and the slurry of product was transferred to a centrifuge where the crystals were separated from the mother liquor. The product was water washed on the centrifuge and finally dried in vacuo at 60° C. to obtain 309.8 g. (78.2% of theory based on resorcinol) or resorcinol bis(beta-hydroxyethyl) ether, melting point 89–91° C.

What is claimed is:

1. In a process for the production of a phenyl-hydroxyalkyl ether by the reaction of a phenolic compound with an alkylene oxide under basic conditions, the improvement comprising reacting the phenolic compound with a less than 10% excess of 1,2-alkylene oxide in an aqueous medium in which the phenolic compound is present in a concentration of 18.7 to 41% by weight, and the pH is from 8 to 13 at ambient temperature to the boiling point of the aqueous medium, cooling the reaction mixture to cause separation of the desired phenylhydroxyalkyl ether from the mother liquor and utilizing said separated mother liquor as the aqueous medium for a subsequent reaction.

2. The process of claim 1 wherein the phenolic compound is phenol.

3. The process of claim 1 wherein the phenolic compound is catechol.

4. The process of claim 1 wherein the phenolic compound is resorcinol.

5. The process of claim 1 wherein the phenolic compound is hydroquinone.

6. The process of claim 1 wherein the alkylene oxide contains from 2–4 carbon atoms.

7. A process for the production of resorcinol bis(beta-hydroxyethyl) ether comprising reacting resorcinol with less than 10% excess of ethylene oxide in an aqueous medium in which the resorcinol is present in a concentration of 18.7 to 41% by weight, at a pH of from 8 to 13 and at a temperature of 75–80° C., cooling the reaction mixture to cause crystallization of resorcinol bis(beta-hydroxethyl) ether from the mother liquor and utilizing said separated mother liquor as an aqueous medium for a subsequent reaction.

References Cited

UNITED STATES PATENTS

| | | | |
|---|---|---|---|
| 1,976,677 | 10/1934 | Wittwer | 260—613 (B) |
| 2,734,087 | 2/1956 | Berger et al. | 260—613 (D) |
| 2,850,480 | 9/1958 | D'Alelio | 260—613 (D) |
| 2,909,551 | 10/1959 | Shibe | 260—613 (D) |
| 3,354,227 | 11/1967 | Katzschmann | 260—613 (D) |

BERNARD HELFIN, Primary Examiner

U.S. Cl. X.R.

260—613 B